United States Patent [19]

Shimizu et al.

[11] Patent Number: 5,285,876
[45] Date of Patent: Feb. 15, 1994

[54] ADAPTIVE DAMPER CONTROL

[75] Inventors: Hiroyuki Shimizu; Shinobu Kakizaki, both of Kanagawa, Japan

[73] Assignee: Atsugi Unisia Corporation, Kanagawa, Japan

[21] Appl. No.: 706,276

[22] Filed: May 28, 1991

[30] Foreign Application Priority Data

May 28, 1990 [JP] Japan .................. 2-55660[U]

[51] Int. Cl.⁵ .................... B60G 17/01; B60G 17/015
[52] U.S. Cl. .................... 188/279; 188/299; 280/707
[58] Field of Search ........... 188/285, 297, 299; 280/707; 364/424.05

[56] References Cited

U.S. PATENT DOCUMENTS

| | | | |
|---|---|---|---|
| 3,827,538 | 8/1974 | Morgan | 188/319 |
| 4,729,580 | 3/1988 | Buma | 280/707 |
| 4,765,649 | 8/1988 | Ikemoto et al. | 280/703 X |
| 4,852,905 | 8/1989 | Tanaka et al. | 280/707 |
| 4,954,957 | 9/1990 | Kawagoe et al. | 364/424.05 |
| 4,997,202 | 3/1991 | Kitagawa et al. | 267/31 |
| 5,016,908 | 5/1991 | Athanas et al. | 280/714 |
| 5,034,890 | 7/1991 | Sugasawa et al. | 280/707 X |
| 5,062,660 | 11/1991 | Satoh et al. | 280/707 |
| 5,087,868 | 2/1992 | Ishibashi et al. | 188/299 |
| 5,200,895 | 4/1993 | Emura et al. | 280/707 |

FOREIGN PATENT DOCUMENTS

| | | |
|---|---|---|
| 337797 | 10/1989 | European Pat. Off. . |
| 3736695 | 5/1988 | Fed. Rep. of Germany . |
| 3843137 | 6/1990 | Fed. Rep. of Germany . |
| 4039839 | 6/1991 | Fed. Rep. of Germany . |
| 63-6238 | 1/1988 | Japan . |
| 1-129914 | 7/1988 | Japan . |
| 84237 | 4/1991 | Japan . |
| 87/07565 | 12/1987 | PCT Int'l Appl. . |
| 88/06983 | 9/1988 | PCT Int'l Appl. ........ 188/299 |
| 1236090 | 6/1971 | United Kingdom . |
| 2222226 | 2/1990 | United Kingdom . |
| 2229252 | 9/1990 | United Kingdom ........ 188/299 |
| 2229253 | 9/1990 | United Kingdom . |
| 2234038 | 1/1991 | United Kingdom . |
| 2239506 | 7/1991 | United Kingdom ........ 188/299 |
| 2242955 | 10/1991 | United Kingdom . |

Primary Examiner—Robert J. Oberleitner
Assistant Examiner—Chris Schwartz
Attorney, Agent, or Firm—Bachman & LaPointe

[57] ABSTRACT

A method of and a system for controlling a hydraulic shock absorber of an automobile are provided. In the shock absorber, a flow of damping fluid induces a load on an actuator of the shock absorber during bouncing and rebouncing of the shock absorber, and the actuator is actuated in response to an output signal of a control unit. In order for the actuator to counteract the load applied thereto, the output signal is modified in response to the load. According to the embodiment, the load is determined by a table look-up operation based on an input load detected by a load sensor mounted to the automobile.

2 Claims, 4 Drawing Sheets

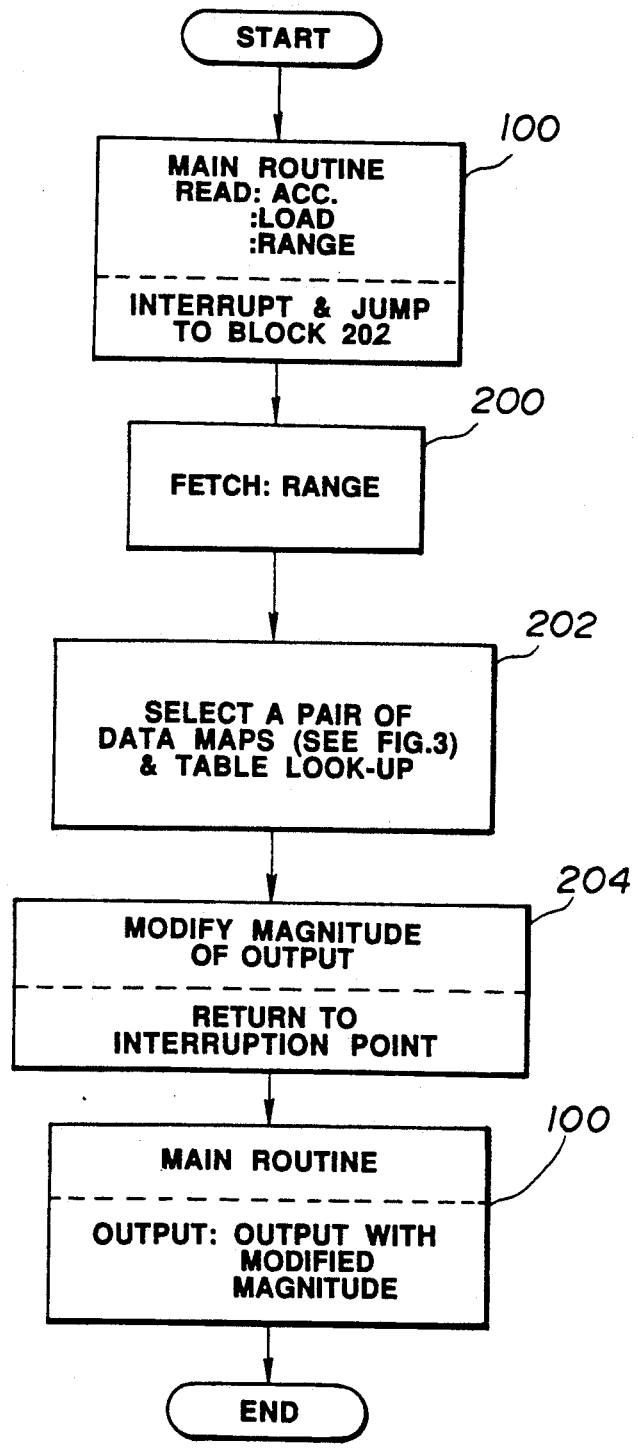

ADAPTIVE DAMPER CONTROL

BACKGROUND OF THE INVENTION

The present invention relates to a method of and a system for controlling a hydraulic shock absorber, and more particularly to a damping force control for a shock absorber of the type wherein a flow of damping fluid induces a load on an actuator during bounding and rebounding of the shock absorber.

A shock absorber of the above mentioned type is used in a known vehicle suspension system disclosed by Japanese Utility Model Application First (unexamined) Publication No. 63-112914. The shock absorber comprises an outer cylinder tube, an inner cylinder tube filled with a damping fluid, a piston slidably disposed in the inner cylinder tube to divide the interior of the inner cylinder tube into a first chamber and a second chamber, and a variable flow restrictor for providing a restricted flow of damping fluid between the first and second chambers during bounding and rebounding of the shock absorber. In order to vary flow area of the flow restrictor passage, a rotary valve is operatively connected to an actuator in the form of a stepper motor operative under the control of a control unit. During bounding and rebounding of the shock absorber, there occurs a flow of damping fluid passing through the restricted flow passage, inducing a load on the rotary valve in such a direction as to increase the opening degree of the restricted flow passage. The load on the rotary valve is applied to the actuator, and variable with a pressure generated by the flow of damping fluid passing through the restricted flow passage. However, the magnitude of an output signal of the control unit remains constant for each of range positions which the shock absorber may be conditioned to operate. Thus, the actuator is not controlled in such a manner as to compensate for a change in load applied to the actuator owing to a flow of damping fluid passing through a restricted flow passage.

Accordingly, an object of the present invention is to provide a method of and a system for controlling a hydraulic shock absorber wherein an actuator is controlled in such a manner as to compensate for a change in load induced by a flow of damping fluid passing through a restricted flow passage during bounding and rebounding of the shock absorber.

SUMMARY OF THE INVENTION

According to one aspect of the present invention, there is provided a method of controlling a hydraulic shock absorber of an automobile wherein a flow of damping fluid induces a load on an actuator of the shock absorber during bounding and rebounding of the shock absorber, and the actuator is actuated in response to an output signal of a control unit, the method comprising the steps of:
determining the load and generating a load indicative signal indicative of the load determined; and
modifying the output signal in response to said load indicative signal such that the output signal modified causes the actuator to operate quickly overcoming the load induced by the flow of damping fluid.

According to another aspect of the present invention, there is provided a system for controlling a hydraulic shock absorber of an automobile wherein a flow of damping fluid induces a load on an actuator of the shock absorber during bounding and rebounding of the shock absorber, and the actuator is actuated in response to an output signal of a control unit, the system comprising:
means for determining an amplitude of a damping force produced by the shock absorber; and
a control unit which includes:
means for determining the load on the actuator in response to said amplitude of damping force determined and generating a load indicative signal indicative of the load detected; and
means for modifying the output signal in response to said load indicative signal such that the output signal modified causes the actuator to operate quickly overcoming the load induced by the flow of damping fluid.

BRIEF DESCRIPTION OF THE DRAWINGS

FIG. 4 is a flow diagram for explaining the operation performed in the control unit.

DETAILED DESCRIPTION OF THE INVENTION

Figure 1:
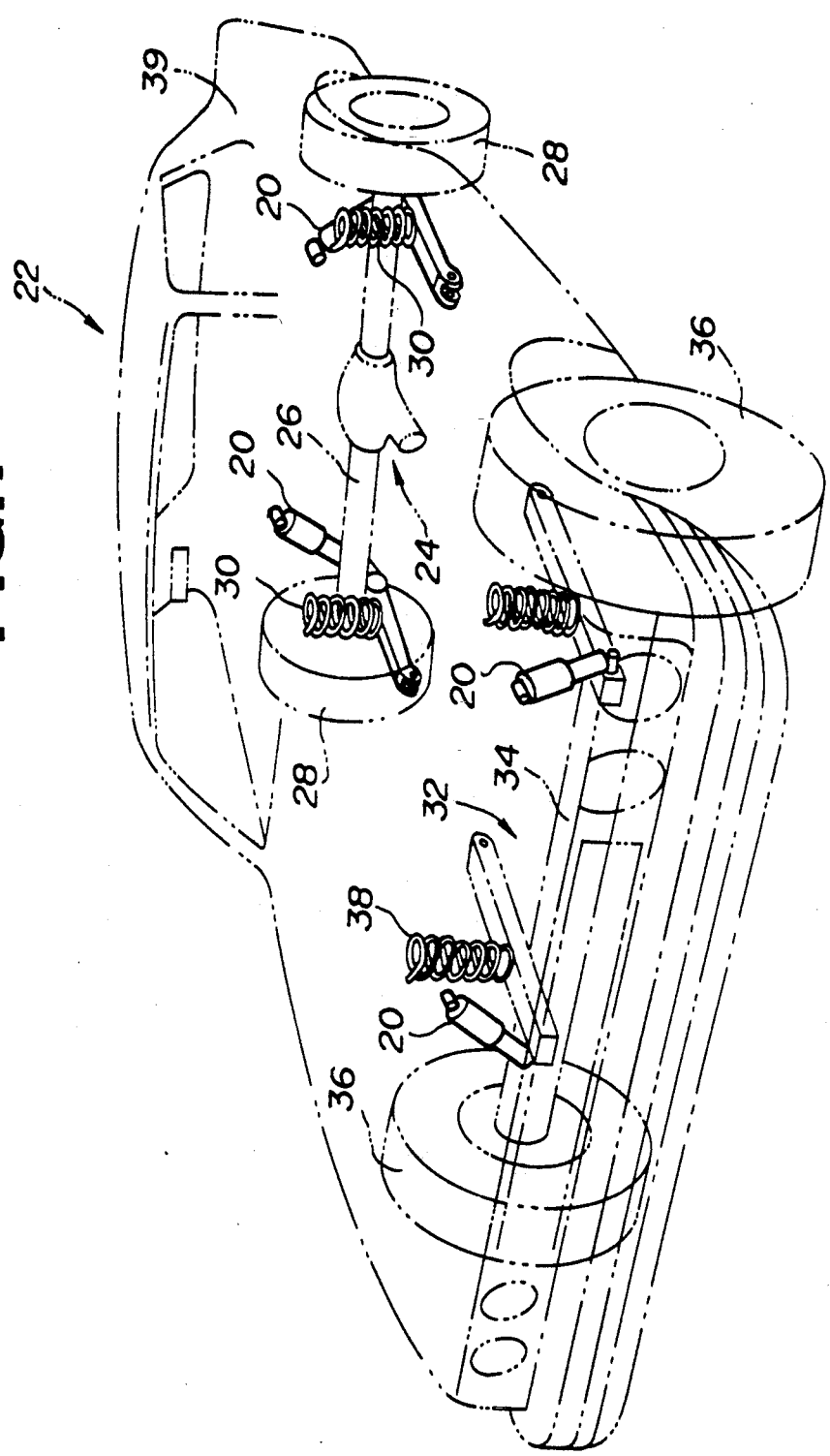
FIG. 1 is a schematic representation of hydraulic shock absorbers in operative association with the typical automobile.

Referring to FIG. 1, a plurality of four shock absorbers 20 are shown. The shock absorbers 20 are shown in operative association with a diagrammatic representation of a conventional automobile 22. The automobile 22 includes a rear suspension 24 having a transversely extending rear axle assembly 26 adapted to operably support to vehicle's rear wheels 28. The axle assembly 26 is operatively connected to the automobile 22 by means of a pair of shock absorbers 20 as well as by the helical coil springs 30. Similarly, the automobile 22 has a front suspension system 32 including a transversely extending front axle assembly 34 to operatively support the front wheels 36. The front axle assembly 34 is operatively connected to the automobile 22 by means of a second pair of the shock absorbers 20 and by the helical coil springs 38. The shock absorbers 20 serve to dampen the relative movement of the unsprung portion (i.e., the front and rear suspensions 32 and 24) and the sprung portion (i.e., the vehicle body 39) of the automobile 22.

The shock absorber 20 is illustrated in FIGS. 4, 5, 6, and 7 and explained in the corresponding description of copending U.S. patent application Ser. No. 07/536,771 filed on Jun. 12, 1990. This U.S. patent application claims priority based on Japanese Patent Application Serial No. 1-222631, now published as Japanese Patent Application First (unexamined) Publication No. 3-84237, and corresponds to German Patent Application No. P40 19 221.0 and United Kingdom Patent Application No. 9013477.6, now published as GB 2 234 038 A.

Briefly, the shock absorber 20 comprises a piston reciprocally disposed within a working chamber defined by an elongated tubular pressure cylinder. The cylinder is connected to the vehicle body. The piston is connected to the vehicle axle assembly through a piston rod, and divides the working chamber into first and second portions to store damping fluid. With a stud, the piston is connected to the piston rod. The stud is hollowed and includes a reduced diameter sleeve portion extending through the piston in axial fit manner by means of a nut threadedly engaging the leading end of the sleeve portion. The sleeve portion is formed with a first pair of diametrically opposed radial ports fluidly disposed and forming a part of a first one-way fluid flow passage which allows one-way flow of damping fluid from the second portion to the first portion during bounding of the shock absorber. The sleeve portion is also formed with a second pair of diameterically opposed radial ports fluidly dispossed and forming a part of a second one-way fluid flow passage which allows one-way flow of damping fluid during rebounding of the shock absorber. The first and second pairs of diametrically opposed radial ports are axially distant from each other and disposed adjacent the opposite axial ends of the piston. In order to variably restrict a radial fluid flow communication between the first pair of radial ports, a first valve spool is disposed in the sleeve portion. Similarly, a second valve spool is disposed in the sleeve portion to variably restrict a radial fluid flow communication between the second pair of radial ports. The two valve spools are threadedly engaged with the inner cylindrical wall defining the hollow of the stud. These spools are turned to advance axially with respect to the sleeve portion to restrict the fluid flow communications between the first radial ports and the second radial ports, respectively.

To turn the spools independently, a retractable control rod assembly has one end connected to the second spool and extends through the first spool which is hollowed and also through a retractable control sleeve assembly connected to the first spool. The retractable control sleeve assembly extends through the piston rod. The flow of damping fluid passing through each of these variable flow restrictors biases the spools in such a direction as to increase the effective flow area of the flow restrictor. The spools are thus biased axially with forces variable with variation in amplitude of damping force during bounding and rebounding of the shock absorber. The axial thrust forces urge the spools to turn in such a rotational direction as to increase the effective areas of the flow restrictors.

Figure 2:
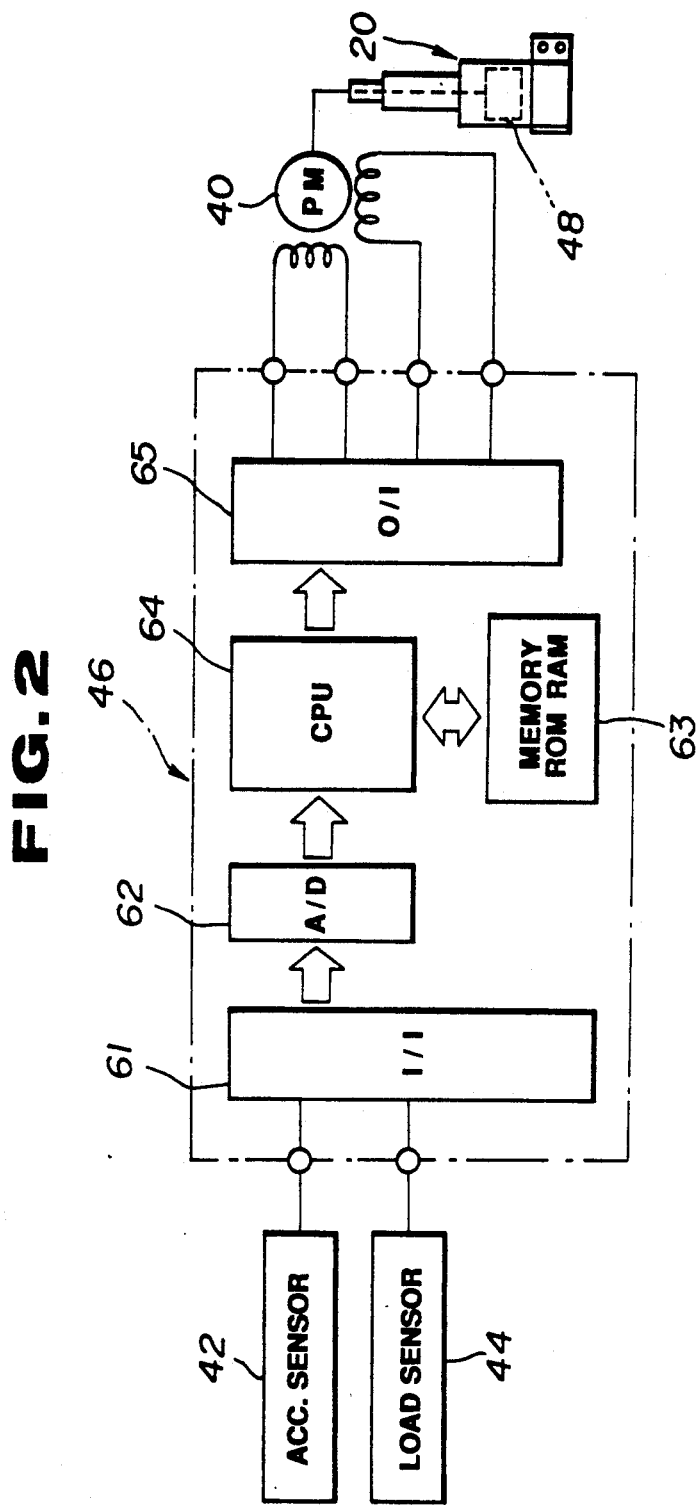
FIG. 2 is a simplified block diagram of one of the shock absorbers in operative association with an actuator under the control of a control unit.

Referring to FIG. 2, there is shown a damping force control system according to the present invention using the shock absorber 20 with the above mentioned variable flow restrictor assembly which is now generally designated by the reference numeral 48. As an actuator, a pulse or stepper motor 40 is drivingly connected to the above-mentioned control rod assembly and control sleeve assembly such that if the stepper motor 40 is turned to an angular position, the spools are turned to advance to axial positions corresponding to this angular position of the motor 40. According to this embodiment, the stepper motor 40 has three angular positions, namely, a hard (H) range position, a medium (M) range position, and a soft (S) range position. A desired angular position to be taken by the stepper motor 40 and an amplitude of electric current passing through each of armature coils of the stepper motor 40 are determined by a microcomputer based control unit 46. A vertical acceleration sensor 42 is mounted to the vehicle body to detect a vertical acceleration of the vehicle body relative to the suspension member and generates an acceleration indicative signal indicative of the vertical acceleration detected. A load sensor 44 is mounted to an upper mount through which the shock absorber 20 is connected to the vehicle body to detect an input load to the vehicle body and generates an input load indicative signal indicative of the input load detected. This input load indicative signal is indicative of an amplitude of a damping force produced by the shock absorber 20. These sensor outputs are fed to the control unit 46. The control unit 46 comprises, as usual, an input interface (I/I) 61, an analog digital converter (A/D) 62, a central processor unit (CPU) 64, a momeory 63 including a read only memory (ROM) and a random access memory (RAM), and an output interface (O/I) 65.

Figure 3:
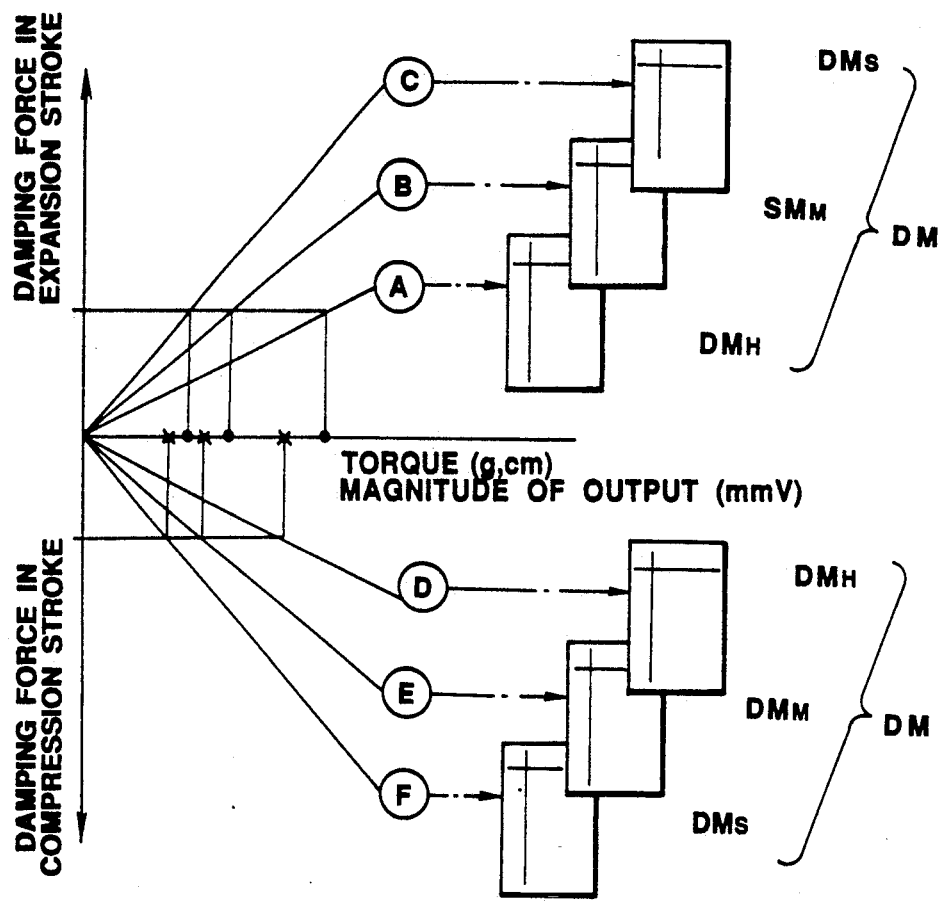
FIG. 3 illustrate data maps stored in a memory of the control unit.

Referring to FIGS. 3 and 4, the principle of operation of the embodiment is explained.

In response to each of the three angular positions of the stepper motor 40, the lands of the variable flow restrictor assembly 48 takes the corresponding axial positions to provide predetermined flow restrictions for bounding and rebounding of the shock absorber 20. During bounding and rebounding of the shock absorber 20, the amount of torque which the control rod assembly and control sleeve assembly are subject to is variable in proportion to an amplitude of a damping force FIG. 3 shows different torque vs., damping force characteristic lines for the different range positions, namely, H, M and S. If the hard (H) range position is selected, the torque varies in such a manner as shown by a pair of torque v.s., damping force characteristic lines A and D. If the soft (S) range position is selected, the torque varies in such a manner as shown by a pair of torque v.s., damping force characteristic lines C and F. If the medium (M) range position is selected, the torque varies in such a manner as shown by a pair of torque v.s., damping force characteristic lines B and E. Based on these characteristic lines, six different data maps are prepared. Each of the data maps contains different magnitudes of output (mmV) for different magnitude of the input load detected by the load sensor 44. The damping force is variable with the input load to the vehicle body and thus detected by the load sensor 44. The different magnitudes contained in each data map are determined such that an amplitude of electric current passing through each armature coils of the stepper motor 40 varies in accordance with the input load during bounding and rebounding of the shock absorber 20. In other words, the characteristic lines A and D are mapped in a pair of data maps $DM_H$ for operation of the shock absorber 20 at the H range position. Similarly, the characteristic lines B and E are mapped in a second pair of data maps $DM_M$ for operation of the shock absorber 20 at the M range position, and the characteristic lines C and F in a third pair of data maps $DM_S$ for operation of the shock absorber 20 at the S range position.

Referring to FIG. 4, there are read-in operations, performed in a main routine 100, of an acceleration indicative signal (ACC) of the acceleration sensor 42, and a load indicative signal (LOAD) of the load sensor 44, and a range position indicative signal (RANGE) indicative of which one of the three range positions is selected. The execution of the main routine is interrupted by an interruption signal occurring at regular intervals and there occurs an instruction to jump to a block 200 of a sub-routine upon occurrence of this interruption. At the block 200, the range indicative signal is fetched. A pair of data maps (see FIG. 3) corresponding to the range indicative signal are selected and a table look-up operation of the selected maps is performed based on the input load indicative signal to determine magnitudes of output and set a larger one of them as a result of the operation. This result is used in a block 204 where an output signal is modified by the result of table look-up operation performed at the block 202 and the execution of this subroutine is ended after this block 204. Thus, there occurs an instruction to return to the interruption point of the main routine 100. In the main routine 100, the modified output signal is outputted. Amplitude of electric current passing through each of the armature coils of the stepper motoro 40 is determined by the modified output signal. Therefore, the stepper motor 40 counteracts a torque applied thereto even if the torque varies.

What is claimed is:

1. In an automobile having a body:
a hydraulic shock absorber so constructed and arranged as to apply a load to the body, said hydraulic shock absorber including a stepper motor rotatable to assume a plurality of range positions and a variable flow restrictor assembly operatively coupled with said stepper motor, said variable flow restrictor assembly providing different restrictions to be applied to flow of hydraulic damping fluid passing therethrough for said plurality of range positions, respectively;
load sensor means for detecting said load applied to the body and generating a load indicative signal indicative of said load detected; and
a control unit including:
means for determining which one of said plurality of range positions said stepper motor assumes and generating a range indicative signal indicative of said determined range position;
means for determining a state of an output signal to be supplied to said stepper motor in response to said range indicative signal;
means for varying a magnitude of said output signal to be supplied to said stepper motor in response to said load indicative signal; and
means for supplying to said stepper motor said output signal having said state determined and said varied magnitude,
whereby said stepper motor holds the range position indicated by said range position indicative signal against a varying torque induced by said flow of hydraulic damping fluid passing through said variable flow restrictor assembly.

2. In an automobile having a body:
a hydraulic shock absorber so constructed and arranged as to apply a load to the body, said hydraulic shock absorber including a stepper motor rotatable to assume a plurality of range positions and a variable flow restrictor assembly operatively coupled with said stepper motor, said variable flow restrictor assembly providing different restrictions to be applied to flow of hydraulic damping fluid passing therethrough for said plurality of range positions, respectively;
load sensor means for detecting said load applied to the body and generating a load indicative signal indicative of said load detected; and
a control unit including:
means for storing a plurality of predetermined data maps, at least one of said plurality of predetermined data maps corresponding to one of said plurality of range positions, each of said plurality of predetermined data maps containing different magnitude data versus different values in said load applied to the body by said hydraulic shock absorber;
means for reading said load indicative signal;
means for determining which one of said plurality of range positions said stepper motor assumes and generating a range indicative signal indicative of said determined range position;
means for selecting out of said plurality of predetermined data maps at least one data map corresponding to said range indicative signal;
means for performing a table look-up operation of said selected data map based on said load indicative signal to retrieve one of said magnitude data for a value in said load indicated by said load indicative signal which has been read;
means for determining a state of an output signal to be supplied to said stepper motor in response to said range indicative signal;
means for varying a magnitude of said output signal to be supplied to said stepper motor in response to said one magnitude data retrieved such that the magnitude of said output signal corresponds to said one magnitude data retrieved; and
means for supplying to said stepper motor said output signal having said state determined and said varied magnitude,
whereby said stepper motor holds the range position indicated by said range position indicative signal against a varying torque induced by said flow of hydraulic damping fluid passing through said variable flow restrictor assembly.

* * * * *